C. W. RODGERS.
APPARATUS FOR MOLDING CONCRETE.
APPLICATION FILED SEPT. 28, 1912.
1,220,461.
Patented Mar. 27, 1917.
3 SHEETS—SHEET 1.
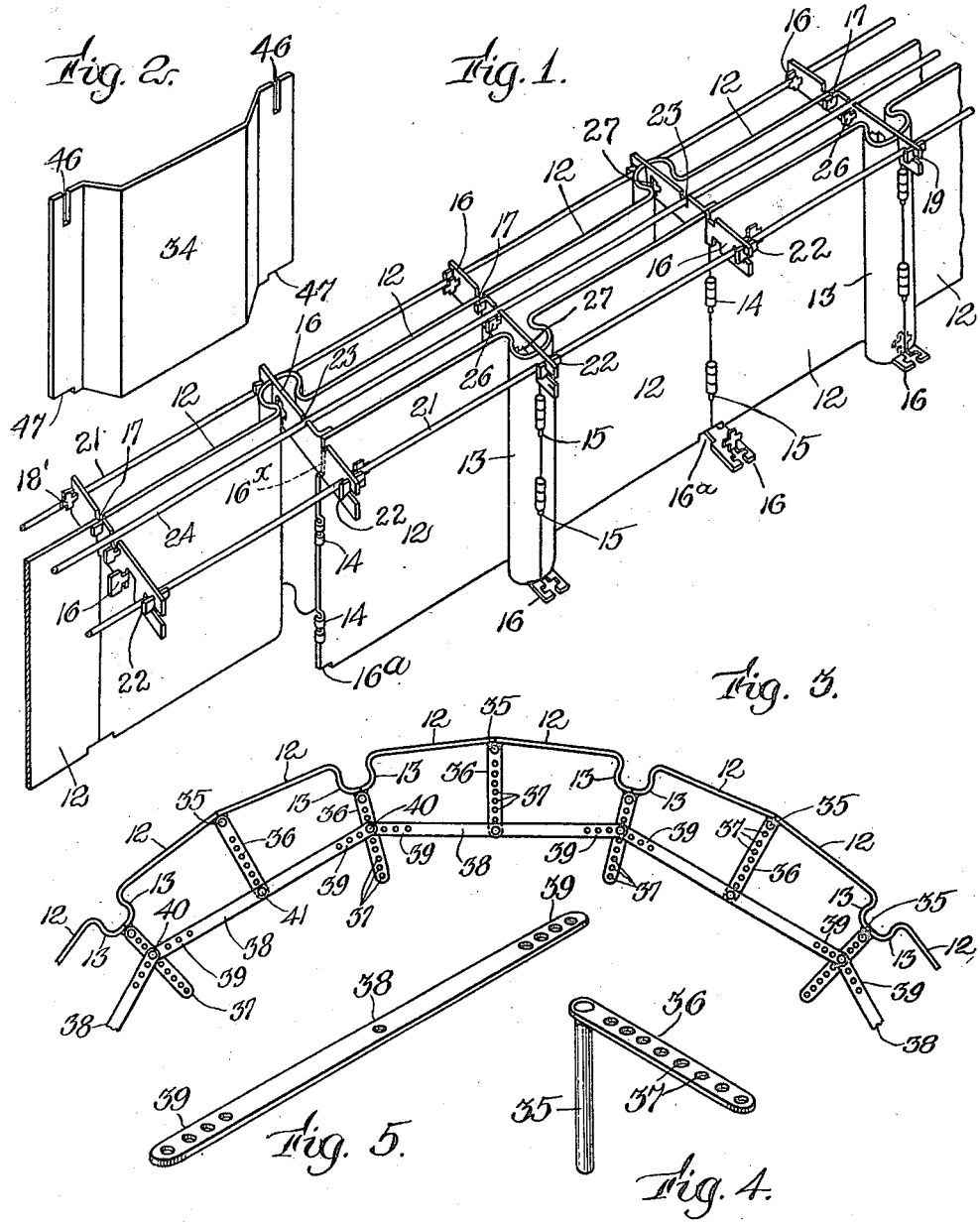

C. W. RODGERS.
APPARATUS FOR MOLDING CONCRETE.
APPLICATION FILED SEPT. 28, 1912.
1,220,461. Patented Mar. 27, 1917.
3 SHEETS—SHEET 2.
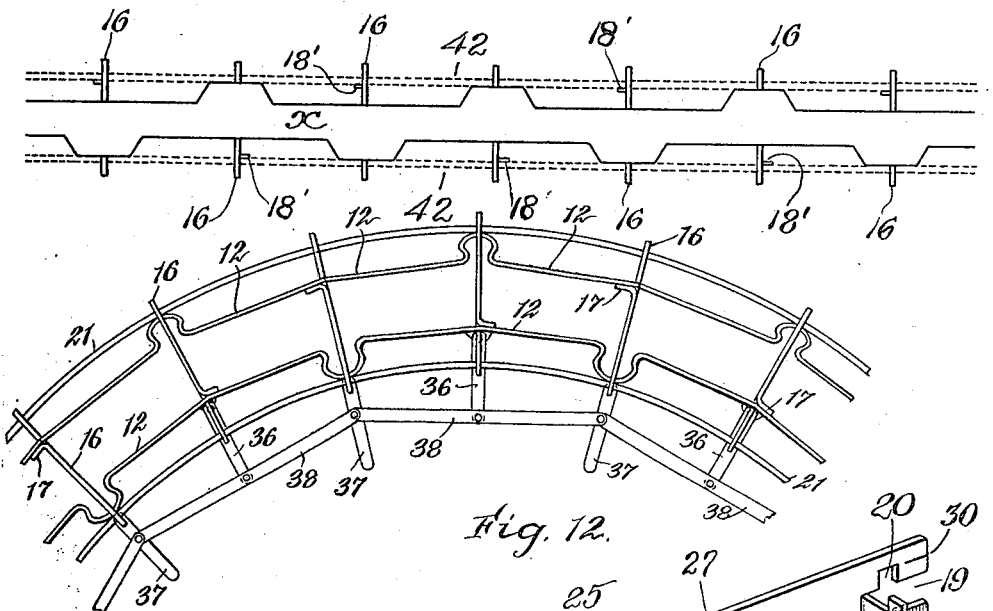
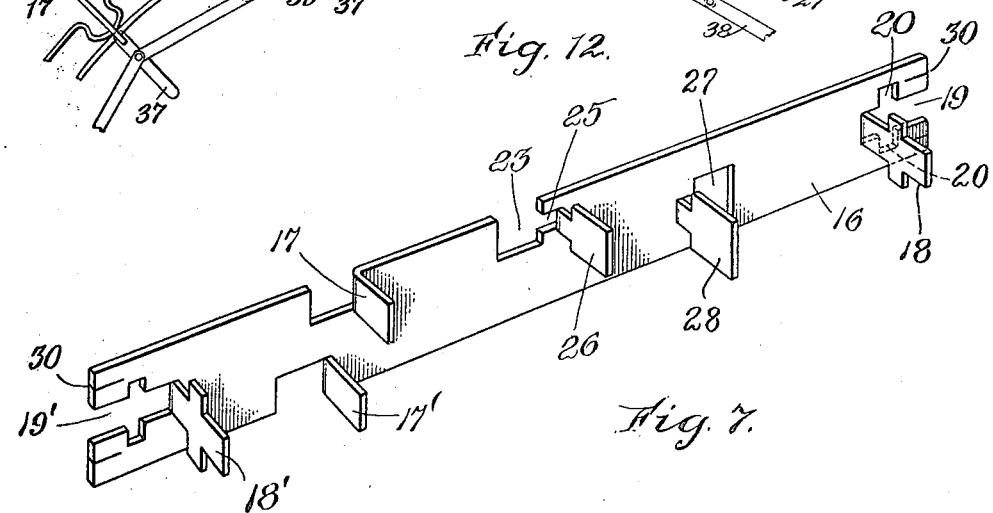
Witnesses:
P. W. Pezzetti
E. Batchelder
Inventor:
Charles W. Rodgers,
by Wright Brown Quinby & May
Attorneys.

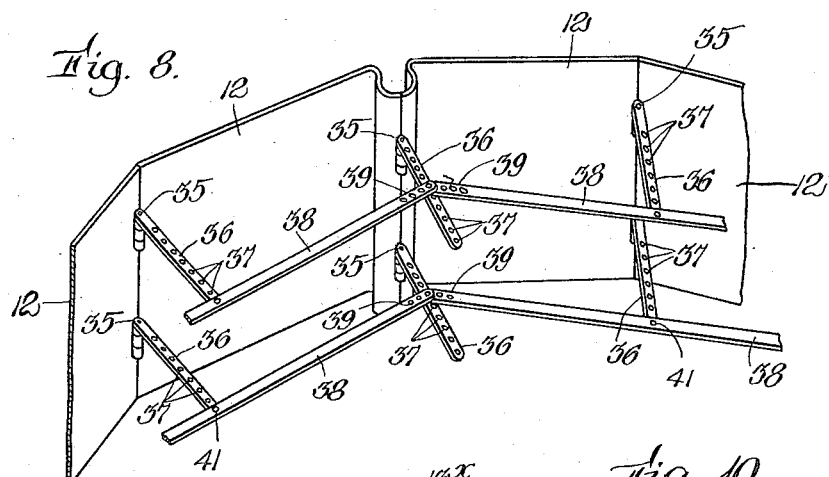
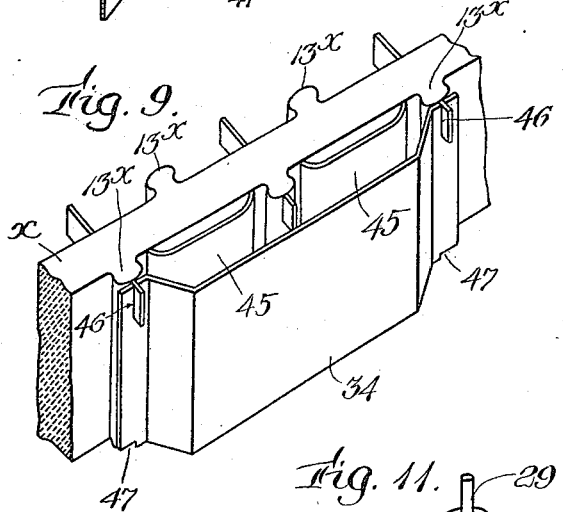
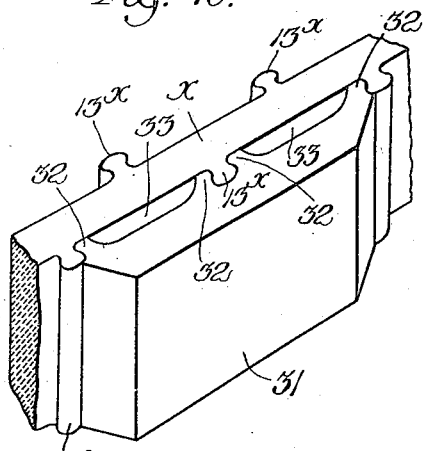
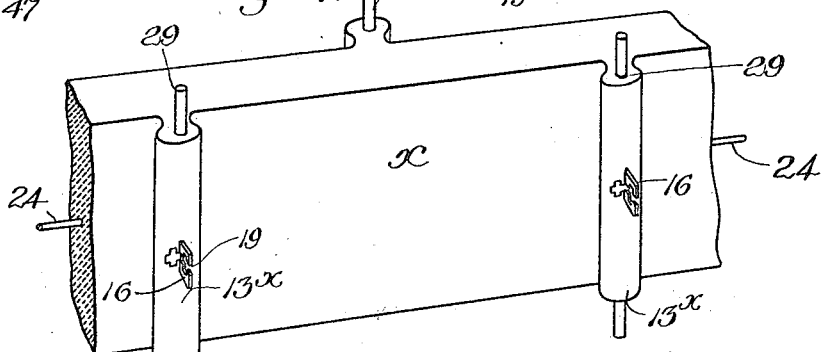

UNITED STATES PATENT OFFICE.

CHARLES W. RODGERS, OF EAST BRIDGEWATER, MASSACHUSETTS.

APPARATUS FOR MOLDING CONCRETE.

1,220,461.  Specification of Letters Patent.  Patented Mar. 27, 1917.

Application filed September 28, 1912. Serial No. 722,843.

*To all whom it may concern:*

Be it known that I, CHARLES W. RODGERS, a citizen of the United States, and resident of East Bridgewater, in the county of Plymouth and State of Massachusetts, have invented certain new and useful Improvements in Apparatus for Molding Concrete, of which the following is a specification.

This invention relates to concrete construction, and its object is to provide improved molds in combination with improved concrete reinforcing members.

Of the accompanying drawings which illustrate apparatus embodying the present invention:

Figure 1 represents a perspective view including a series of separable molding units connected together in hinged relation for molding a wall, spacing bars which first serve to space the molding units and which afterward remain permanently in the concrete and reinforce the same, a rod for reinforcing the concrete, and rods for connecting the aforesaid spacing bars.

Fig. 2 represents a molding unit of angular form which is adapted to be used with others of the same style instead of the hinged units shown by Fig. 1.

Fig. 3 represents a series of hinged molding units of the same style as those shown by Fig. 1, the units being arranged for the construction of an arch and suitably braced by detachable connecting members.

Fig. 4 is represents a perspective view of a hinge member included in Fig. 3.

Fig. 5 represents a perspective view of a brace or strut adapted to be used in conjunction with the device shown by Fig. 4.

Fig. 6 represents a top plan view of a wall molded by molding units such as that shown by Fig. 2.

Fig. 7 represents a perspective view of one of the spacing bars included in Figs. 1 and 6.

Fig. 8 represents a perspective view of structure similar to that shown by Fig. 3, the same being arranged for molding a bay or analogous structure.

Fig. 9 represents a perspective view of a portion of a molded wall to which are attached molding plates for forming finishing blocks of concrete upon the exterior of the wall.

Fig. 10 represents a perspective view corresponding to Fig. 9, showing the same section of wall and a molded concrete finishing block interlocked therewith.

Fig. 11 represents a perspective view of a straight wall such as that which would be formed by the apparatus shown in Fig. 1.

Fig. 12 is a plan view of structure arranged for molding a curved wall.

The same reference characters indicate the same parts wherever they occur.

Referring first to the apparatus shown by Fig. 1, the molding plates or units are indicated at 12. One end of each plate is turned back and formed with a reverse curve, as indicated at 13, to the end that when two of these curved portions are placed adjacent each other as shown they will be adapted to mold undercut ribs such as those indicated at 13× in Fig. 11. The ends of the molding plates are provided with ears 14, those of one plate being adapted to coöperate with similar ears of another plate, to form a hinge when a suitable hinge pin such as 15 is inserted. A series comprising an indefinite number of these units may thus be connected in hinged relation. When the plates are connected in series, the straight or flat ends are placed together and the bent ends 13 are placed together. The hinges not only serve to hold the several units in the desired relative position for molding, but they enable the plates to swing relatively to each other when removing them from the hardened concrete. The hinge connections are provided at the straight ends of the plates more for merely locking the plates together than for permitting relative swinging movement at these points, but the capacity to swing is more important at the curved ends 13. For example, when a molded wall has hardened and it is desired to remove the mold, it is not necessary to remove the hinge pins at the points where the concrete ribs 13× are formed, but it is only necessary to remove the pins from the joints midway between these ribs. The flat ends of the plates, upon being disconnected from each other, may be swung away from the concrete, and in this way the curved ends 13 are opened sufficiently to enable them to be removed laterally from the ribs 13×.

When the molding plates are assembled for use, those which will be upon one side of the molded concrete may be spaced at the desired distance from those which will be at the opposite side of the concrete, by means of spacing bars 16 like that shown by Fig. 7. While the primary function of these bars is to space the molding plates, an additional function is to reinforce the concrete which is molded about them, and they are also adapted to hold in place other reinforcing members hereinafter described. The bar 16 in the form shown is made of ductile sheet metal and is provided with a variety of tongues and notches all of which may be produced by a single blow of a die press. The length of the spacing bar is considerably more than the thickness of the wall which is to be molded, and the bar is placed so that its length will be at right angles to the thickness of the wall, and the ends of the bar will project from the wall so that they may be used for attaching other members of a wall structure such, for example, as metal lath. The tongues 17, 17' and 18 are adapted to engage the inner surface of the molding plates and thus prevent the plates from approaching too closely toward each other. The function of these tongues is to determine the space between the plates on one side and the plates on the opposite side and thus determine the thickness of the wall. The tongue 17' is preferably in a different vertical plane from the tongue 17, so that one or the other, as desired, may be used for spacing the plates and thus hold the plates at a relatively great distance apart or at a less distance apart. The molding plates are provided with suitable notches 16$^a$ at their ends, which notches register with each other when the plates are assembled, and provide sufficient space for the reception of the spacing bars. The notches just designated are intended for use when the spacing bars will stand upright; but if it should be desired to arrange the spacing bars so that their broad flat surfaces are horizontal instead of vertical, the bars may be inserted in the notches indicated at 16$^a$.

It will be observed, referring to Fig. 1, that the molding plates of the series on one side of the wall are staggered with relation to those on the other side, this arrangement being adapted to produce a wall of which the ribs 13$^\times$ are staggered as shown by Fig. 11. From this it follows that the joint between two flat ends of the plates on one side of the wall will be in line with the joint between the curved ends 13 on the opposite side, and a spacing bar at this point will project more from the straight joint than from the curved joint opposite.

It may be stated at this point that the tongues 17, 17' and 18 will be embedded in the molded concrete and remain fixed. It will be observed that the remaining metal from which the tongue 18 is struck out defines a relatively large notch 19 and two relatively small notches 20, 20, which are opposite each other. Each notch 19 is open at the end of the bar and is adapted to receive a rod 21 which may be inserted laterally, and the notches 20, 20, are adapted to receive a key 22 for securing the rod 21 in the notch 19. In some instances it may be desirable to use the rod 21 for bracing the assembled molding units prior to pouring the concrete, and it is thus shown assembled for this purpose. In this case the rod 21 will be removed after the concrete has hardened, in order to facilitate the removal of the molding plates. The rod may thereafter be restored to this position if it is desired to otherwise use it, as hereinafter explained. The keys 22 are made of small bits of sheet metal and are preferably wedge-shaped so that when they are driven into the notches 20 they will become tightly bound to the spacing bar 16. The tongues 18' which are outside the flat joints of the molding plates rather than the curved joints, remain exposed after the wall is molded, but the notches 19' thereby provided are nevertheless adapted to receive the rod 21 in the same manner as the notches 19.

The spacing bars 16 are notched, as indicated at 23, for the reception of a rod 24 for reinforcing the concrete. These notches are open at the edges of the bars, and the reinforcing rods are therefore adapted to be inserted laterally. One edge of each notch 23 is provided with a smaller notch 25 in which a wedge 22 may be driven for binding the rod 24 relatively to the spacing bar. The tongue 26 which is struck out from the spacing bar in forming the notch 23 may be used, if desired, to otherwise secure the rod 24 by binding the rod and tongue together with wire. The spacing bar is provided with one more notch, indicated at 27, from which a tongue 28 is struck. This notch and tongue are substantially the same as those indicated at 23 and 26, and are provided for securing a rod for reinforcing the ribs 13$^\times$. As shown by Fig. 11, these ribs have rods 29 extending longitudinally through them, but the ribs may be made with or without these rods. In case it is desired to provide the ribs with reinforcing rods, some of the spacing bars 16 may be disposed so that their flat surfaces are horizontal, as shown at the bottom of the molding plates in Fig. 1. In this event the spacing bars so disposed are adapted to be secured to the rods 29 in substantially the same manner as the method above described for securing the rods 24 in the notches 23. Those spacing bars which are turned to receive the vertical rods 29 will not receive the horizontal rods 24, but the spacing bars may be turned to whichever position is necessary to form the desired connections. The tongues 26 and 28, upon being embedded in the concrete, assist in reinforcing the same and in securing the spacing bar.

When the molding plates are all removed from the wall, leaving the ends of the spacing bars projecting in some instances from the ribs 13× and in other instances midway between the ribs, the wall is ready to receive both exterior and interior finishing. For example, it may be desired to attach ornamental concrete blocks to the exterior, or it may be desirable to attach upon both sides metal lath 42 as shown by Fig. 6, that upon the inner side being for the usual plaster, and that on the outer side serving as a foundation for stucco work. The projecting ends of the spacing bars are especially adapted to receive and secure metal laths. The two parallel tongues which are formed as the result of providing the notch 19 may project through openings in the metal lath and may be bent laterally so as to clench the lath against the ribs 13×. Instead of clenching the lath in this manner it may be preferable to use the rods 21, which, as already stated, are useful for another purpose than steadying the assembled molding units prior to and during the pouring. In the event of using the rods 21 to secure the metal lath, the former will be secured to the spacing bars before the metal lath is attached, the keys 22 being used to secure the rods in the manner hereinbefore explained. When the rods 21 have thus been secured, the metal lath must be placed against them, the projecting ends of the spacing bars being inserted through the openings in the metal lath and then bent laterally so as to clench the lath in place. In order to facilitate the bending of the ends of the spacing bar for this purpose, the ends of the bar are slit, as indicated at 30, thus providing a plurality of relatively narrow tongues which may be easily bent. The metal lath may then be secured to the rods along the stretches between the ribs 13× by any suitable means, such as wire, thus bracing the metal lath so that it will not be so likely to bulge when loaded with plaster.

Fig. 10 illustrates a concrete finishing block which is molded upon and interlocked with a core wall previously erected. Fig. 9 illustrates molds secured to a core wall in position to mold a finishing block such as that shown by Fig. 10. The core wall is here indicated at *x*, and the finishing block is indicated at 31. The block is provided with four parallel ribs 32,—one at each end and two near the middle. The two middle ribs are shown as embracing one of the ribs 13× of the core wall, while the two end ribs 32 are interlocked with other ribs 13× of the core wall. The formation of these ribs, whereby they are undercut, secures the block 31 to the core wall in dovetailed relation. The spaces indicated at 33 afford air cells whereby the transmission of heat and cold through the wall is rendered more difficult.

The apparatus included in Fig. 9 for molding a block such as that shown by Fig. 10 comprises an exterior plate or mold 34 and two interior plates or cores 45 for each block. The plate 34 is similar to that shown by Fig. 2. It is provided with notches 46 adapted to fit over spacing bars whose flat surfaces are vertical, and is further provided with notches 47 adapted to fit over spacing bars whose flat surfaces are horizontal. The plate is therefore adapted to be secured to a core wall by means of spacing bars in either position. The keys 22 may be used for securing the plates 34 to the spacing bars. The cores 45 are placed against the flat surface of the hardened core wall and may be held in place manually or otherwise until a sufficient quantity of concrete has been poured to hold them in place, after which they will be held against the previously constructed wall by the incoming concrete. When each block 31 has set sufficiently, the cores 45 may be withdrawn endwise; and after the blocks have hardened, the molding plates 34 may be removed.

The same hinged molding plates which are used for straight walls are adapted to be used for curved walls, bays, arches, or other structure which is otherwise than straight. For example, Fig. 3 shows a series of hinged plates 12 in position to form an arch. These plates are connected to each other in the same relation as that shown in Fig. 1, but instead of being connected by simple hinge pins 15, as shown in Fig. 1, they are connected by hinge pins 35. (See Fig. 4). Each pin 35 is provided with a head or handle 36 which is adapted to be used as a strut for bracing the molding plates. Each strut has a series of holes 37 for the reception of a connecting pin 41. The struts which are adjacent the curved ends 13 of the molding plates are connected one with another by links 38. One of these links is illustrated alone by Fig. 5. Each end of each link is provided with a series of holes 39, each hole being adapted to receive a pin 40. The several holes 39 in the links, and the several holes 37 in the struts, permit connecting the struts according to various adjustments whereby the desired curvature of the series is obtained. The struts which lead to the hinge pins which connect the flat ends of the molding plates are secured to the links 38 midway between the ends of the latter by pins 41. This arrangement of links and struts is shown in perspective by Fig. 8, in which the molding plates stand upright on edge, in position to form a bay or curved wall.

The spacing bars 16 and additional molding plates for the outer side of the wall or bay may be used in conjunction with the molding plates as shown by Figs. 3 and 8, just as well as when the plates are arranged to form a straight wall. The outer plates and spacing bars are omitted to simplify the drawings, and their arrangement would be obvious in view of that shown by Fig. 1. When all the parts are in operative position to form an angular wall or bay, the adjustable struts 36 and links 38 coöperate with the spacing bars 16 and outer plates just as much as with the inner plates shown.

I claim:

1. In combination, a series of molding members having connecting hinges, a bracing structure, and struts connecting said molding members and said bracing structure to sustain the pressure of the molded structure against said molding members, said struts and bracing structure having adjustable connections arranged to vary the angular relation of said molding members.

2. In combination, a series of molding members having connecting hinges, a series of braces extending approximately parallel to the first-mentioned series, each of said braces being as long as two such molding members, and struts each attached to one of said molding members and to one of said braces, each of said molding members having one of such struts, said struts and braces having provisions for holding them in various relative positions to hold said molding members in various angular relations.

3. In combination, a series of molding members having connecting hinges, struts connected to and extending from said molding members respectively, said struts being arranged in a series, and a series of tie rods each connecting three successive said struts, said struts and tie rods being arranged to sustain conjointly outward stress against said molding members.

4. The combination with molding units arranged to coöperate to mold opposite surfaces of a single body, of means connecting the opposed molding units to hold them in coöperative relation, hinges connecting said units, braces extending away from said units substantially at right angles to the axes of said hinges, braces for connecting said first-mentioned braces with each other, and means for securing said braces to each other in various relative positions whereby the molding units may be held at angles relatively to each other.

5. The combination with reinforcing members projecting from a molded body, of a molding member having provision for receiving the projecting portions of said reinforcing members, and keys for securing said molding member to said reinforcing members, said projecting portions having provision for the reception of said keys.

6. The combination with reinforcing members, of a molded body having parallel dovetail ribs, said reinforcing members projecting from said ribs, of a molding member having provision for receiving the projecting portions of said reinforcing members, and keys for securing said molding member to said reinforcing members, said projecting portions having provision for receiving said keys.

7. In combination, a series of molding members having connecting hinges, the pins of said hinges having laterally extending strut members, and a series of braces extending approximately parallel to the first-mentioned series, each of said braces being as long as two of said molding members, and means for connecting each of said braces to a plurality of said strut members, said means being capable of various adjustments of said braces and strut members to hold said molding members in various angular relations.

In testimony whereof I have affixed my signature, in presence of two witnesses.

CHARLES W. RODGERS.

Witnesses:
WALTER P. ABELL,
JAS. H. CHURCHILL.

Copies of this patent may be obtained for five cents each, by addressing the "Commissioner of Patents. Washington, D. C."